(12) United States Patent
Nanos

(10) Patent No.: US 11,597,793 B2
(45) Date of Patent: *Mar. 7, 2023

(54) BIO-BASED AND HYDROPHILIC POLYURETHANE PREPOLYMER MIXTURE

(71) Applicant: BIONANOFOAM LLC, Ann Arbor, MI (US)

(72) Inventor: John I. Nanos, Ann Arbor, MI (US)

(73) Assignee: BioNanoFoam LLC, Ann Arbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/892,096

(22) Filed: Aug. 21, 2022

(65) Prior Publication Data
US 2022/0396660 A1 Dec. 15, 2022

Related U.S. Application Data

(63) Continuation-in-part of application No. 17/524,639, filed on Nov. 11, 2021, now Pat. No. 11,421,077, which is a continuation-in-part of application No. 16/900,728, filed on Jun. 12, 2020, now Pat. No. 11,518,841, which is a continuation-in-part of application No. 15/655,854, filed on Jul. 20, 2017, now Pat. No. 10,975,190.

(60) Provisional application No. 62/365,178, filed on Jul. 21, 2016.

(51) Int. Cl.
| | |
|---|---|
| *C08G 18/08* | (2006.01) |
| *C08G 18/10* | (2006.01) |
| *C08G 18/48* | (2006.01) |
| *C08G 101/00* | (2006.01) |

(52) U.S. Cl.
CPC ......... *C08G 18/4833* (2013.01); *C08G 18/10* (2013.01); *C08G 18/14* (2013.01); *C08G 2101/00* (2013.01); *C08G 2110/0083* (2021.01); *C08G 2650/04* (2013.01); *C08G 2650/36* (2013.01)

(58) Field of Classification Search
CPC ..................................................... B01D 15/00
See application file for complete search history.

(56) References Cited

U.S. PATENT DOCUMENTS

| | | | | |
|---|---|---|---|---|
| 3,890,254 A * | 6/1975 | Guthrie | ............. | C08G 18/4833 |
| | | | | 521/905 |
| 4,137,200 A * | 1/1979 | Wood | .................... | C08G 18/10 |
| | | | | 521/905 |
| 4,528,364 A * | 7/1985 | Prier | ...................... | C07C 68/08 |
| | | | | 528/370 |
| 5,065,752 A * | 11/1991 | Sessions | ............... | A61L 15/425 |
| | | | | 428/317.1 |
| 6,858,655 B1 * | 2/2005 | Hofmann | ........... | C08G 18/4845 |
| | | | | 521/174 |
| 9,085,761 B1 * | 7/2015 | McGall | .................. | C12Q 1/686 |
| 2007/0032583 A1 * | 2/2007 | Han | .................. | C08G 18/0885 |
| | | | | 524/590 |
| 2011/0269863 A1 * | 11/2011 | Kunst | .................... | C08G 18/10 |
| | | | | 568/679 |
| 2014/0243560 A1 * | 8/2014 | Lorenz | .................. | C08G 65/30 |
| | | | | 568/679 |
| 2017/0158875 A1 * | 6/2017 | Jones, Jr. | ........... | C08G 18/4825 |
| 2018/0022855 A1 * | 1/2018 | Nanos | ................. | C08G 18/797 |
| | | | | 521/159 |

\* cited by examiner

*Primary Examiner* — Melissa A Rioja
(74) *Attorney, Agent, or Firm* — Stanley E. Jelic

(57) ABSTRACT

A substantially biobased prepolymer mixture including 31.80 to 67.95 percent biogenic carbon content by weight, wherein the mixture is a combination of: an isocyanate; and a cleaned biobased polyoxyalkylene glycol polyol, wherein the cleaned biobased polyoxyalkylene glycol polyol is completely primary hydroxyl-tipped or primary hydroxyl endgrouped, further wherein said cleaned biobased polyoxyalkylene glycol polyol is polymerized from 100% biobased ethylene oxide, further wherein the cleaned biobased polyoxyalkylene glycol polyol comprises less than 15 ppm sodium and potassium metals, and further wherein the cleaned biobased polyoxyalkylene glycol polyol comprises less than 0.5% water by weight.

2 Claims, 4 Drawing Sheets

Initiator     Ethylene Oxide            An EO Polymer

Propylene Oxide          An EO/PO Block Copolymer

BIO-BASED AND HYDROPHILIC POLYURETHANE PREPOLYMER MIXTURE

CROSS-REFERENCE TO RELATED APPLICATIONS

This non-provisional application is a continuation-in-part of pending non-provisional application Ser. No. 17/524,639 (filed on Nov. 11, 2021), which is a continuation-in-part of pending non-provisional application Ser. No. 16/900,728 (filed on Jun. 12, 2020), which is a continuation-in-part of patented non-provisional application Ser. No. 15/655,854 (filed on Jul. 20, 2017 and granted patent number 10975190 on Apr. 13, 2021), which claims the priority benefit of provisional application 62/365,178 (filed Jul. 21, 2016), all of which are incorporated by reference herein in their entirety.

TECHNICAL FIELD

The present disclosure relates to bio-based and hydrophilic prepolymers and polyurethane foams. More particularly, the disclosure discusses prepolymers and foams created with feedstocks that are derived from biological sources rather than the traditional petroleum-based feedstocks.

BACKGROUND

The statements in this section merely provide background information related to the present disclosure. Accordingly, such statements are not intended to constitute an admission of prior art.

Biology offers an attractive alternative for industrial manufacturers looking to reduce or replace their reliance on non-renewable petrochemicals and petroleum derived products. The replacement of petrochemicals and petroleum derived products with products and/or feedstocks derived from biological sources (i.e., biobased products) offer many advantages. For example, products and feedstocks from biological sources are typically a renewable resource so there is the inherent advantage of non-depletion of non-renewable natural resources. Also, as the supply of easily extracted petrochemicals continue to be depleted, the economic and political ramifications of petrochemical production will likely force the cost of the petrochemicals and petroleum derived products higher as compared to their biobased analogs. In addition, companies can benefit from the marketing advantages associated with bioderived products from renewable resources in the view of a public becoming more concerned with sustainability and the supply of petrochemicals and other non-renewable resources.

Traditional or conventional polyether and polyester polyurethane foams are inherently hydrophobic and historically derived entirely from petroleum-based resources. Methods and information for those skilled in the art to replace petroleum based raw materials in the polyurethane realm have centered around the use of Natural Oil Polyols (NOPs)—Vegetable based oils like castor, soy, linseed, and the like—as equivalent synthons to their petroleum-based counterparts in the production and commercialization of renewable and biobased polyurethane systems and foams. By their very nature, fatty acid based oils are inherently hydrophobic so there exists a mutual exclusion of polyurethane foam hydrophilicity and natural oil-based content. This invention relates to a new class of hydrophilic polyurethane prepolymers and foams that are based on poly(alkyloxide) polyols originating from plant-based and renewable hydrophilic raw materials, namely high or all-EO based polyether polyols based on fermented sugars. The use of these hydrophilic and renewable polyols allow the production of hydrophilic capped polyurethane prepolymers that are subsequently foamed in the presence of a large amount of water when admixed intimately during the foaming process.

There is a unique subset of polyurethane foams and technologies that deal with hydrophilic cellular foams, meaning specifically, foams that will readily uptake and reservoir a substantial weight (fluid) to weight (foam) percentage of contact liquid/fluid. Typically a hydrophilic foam is one that will 1) readily accept or wick fluid (>10 seconds) when said fluid is placed in contact with the foam surface and 2) readily absorb said fluid (>5 g fluid/g foam) and 3) adequately retain (>2 g/g) the fluid when the foam is saturated. One such class of hydrophilic foams can be prepared by a "prepolymer" process in which a hydrophilic prepolymer having isocyanate end groups is mixed and reacted with an excess of water. U.S. Pat. Nos. 3,861,993 and 3,889,417 disclose a hydrophilic polyurethane foam which is formed by mixing and reacting with water an isocyanate capped polyoxyethylene glycol prepolymer using a molar ratio of $H_2O$ to NCO groups in the prepolymer of 6.5 to 390:1.

Commercial hydrophilic polyurethane foams of this type, known in the art as HYPOL® foams, are prepared by mixing and reacting the prepolymers with water along with other foam modifying additives or fillers. HYPOL® prepolymers are available from The Dow Chemical Company. Similar hydrophilic prepolymers are manufactured and marketed by several other companies, including Rynel Inc., Lendell Manufacturing Inc., Mace Engineering, The Carpenter Company, and the Chemlogics Group.

All these Hypol and similar Hypol-like hydrophilic prepolymers utilize a polyoxyethylene glycol (PEG) polyol as the main polyether polyol component (>50% total polyol content w/w %) within the entire prepolymer composition and in an aqueous-rich (>15% water) two-stage process of foam production. The prepolymers, and the aqueous two-stage process foams produced therefrom, are disclosed in U.S. Pat. No. 4,365,025. It is the hydrogen-bonding of polar molecules along this EO backbone that imparts the inherent hydrophilicity to the resultant foams made from these isocyanate-capped polyether prepolymers. To date all hydrophilic, Hypol-like, PEG-based prepolymers are based on petroleum derived polyol raw materials, namely petroleum derived ethylene oxide (EO) based polyols.

The present disclosure relates to the use of sugarcane-based derivatives to yield a biobased PEG moiety than can be reacted to produce inherently hydrophilic and bio-based polyurethane prepolymers and foams.

BRIEF SUMMARY OF THE INVENTION

In one embodiment, a substantially biobased prepolymer mixture comprises 31.80 to 67.95 percent biogenic carbon content by weight, wherein the mixture is a combination of: an isocyanate; and a cleaned biobased polyoxyalkylene glycol polyol, wherein the cleaned biobased polyoxyalkylene glycol polyol is completely primary hydroxyl-tipped or primary hydroxyl end-grouped, further wherein said cleaned biobased polyoxyalkylene glycol polyol is polymerized from 100% biobased ethylene oxide, further wherein the cleaned biobased polyoxyalkylene glycol polyol comprises less than 15 ppm sodium and potassium metals, and further wherein the cleaned biobased polyoxyalkylene glycol polyol comprises less than 0.5% water by weight.

In one embodiment, a substantially biobased prepolymer mixture comprising 31.80 to 67.95 percent biogenic carbon content by weight, wherein the mixture is a combination of: an isocyanate; and a cleaned biobased polyoxyalkylene glycol polyol with an oxyethylene content of greater than 50 mole percent, further wherein said cleaned biobased polyoxyalkylene glycol polyol is polymerized from 100% biobased ethylene oxide, further wherein the cleaned biobased polyoxyalkylene glycol polyol comprises less than 15 ppm sodium and potassium metals, and further wherein the cleaned biobased polyoxyalkylene glycol polyol comprises less than 0.5% water by weight.

In one embodiment, said biobased polyoxyalkylene glycol polyol is derived from a starting material that is substantially a biobased and sustainable raw material.

In one embodiment, said biobased polyoxyalkylene glycol polyol is polymerized from 100% biobased ethylene oxide.

In one embodiment, wherein said biobased polyoxyalkylene glycol polyol comprises a backbone of a prepolymer resulting in a three-dimensional network.

In one embodiment, said biobased polyoxyalkylene glycol polyol is capped with sufficient isocyanate to react all of a theoretically available hydroxyl functionality which creates the polyurethane prepolymer, that is thereafter admixed with water to create the hydrophilic foam.

The biobased polyoxyethylene polyol used as the main reactant in preparing the capped product to be foamed may have a weight average molecular weight of about 200 to about 20,000, and preferably between about 600 to 6,000, with hydroxyl functionality of about 2 or greater, preferably from about 2 to about 8.

In the present disclosure, the amount of water employed when admixing with the isocyanate capped substantially biobased PEG prepolymer mixture should exceed 6.5 moles $H_2O$ per mole of NCO groups. The water employed can range up to about 390 moles $H_2O$/mole NCO groups. Thus, the available water content in the aqueous reactant is at least 6.5 and can fall within a range from about 6.5 to about 390 moles $H_2O$ per mole of NCO groups.

In one embodiment, a method of making a substantially bio-based polyurethane prepolymer and foam comprises: (a) cleaning a bio-based polyoxyalkylene glycol polyol by a method comprising the steps of adding an adsorbent to the biobased polyoxyalkylene glycol polyol to create a mixture in the ratio of 0.5% to 5.0% adsorbent to biobased polyoxyalkylene glycol polyol by weight, stirring the mixture in a gaseous nitrogen environment, replacing the gaseous nitrogen environment with a gaseous carbon dioxide environment, and filtering the mixture to separate impurities from the mixture and create a cleaned bio-based polyoxyalkylene glycol polyol which is suitable for prepolymer preparations; (b) mixing the cleaned bio-based polyoxyalkylene glycol polyol with a polyfunctional isocyanate to create a substantially biobased polyurethane prepolymer; and (c) foaming the substantially biobased polyurethane prepolymer by admixing with an excess of water to make the substantially bio-based hydrophilic polyurethane foam.

In one embodiment, the isocyanate is chosen from the group consisting essentially of PAPI (a polyaryl polymethylenepolyisocyanate as defined in U.S. Pat. No. 2,683,730), toluene diisocyanate, triphenylmethane-4,4',4"-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1,5-diisocyanate, xylene-alpha, 3,3'-dimethyl-4,4'-biphenylene diisocyanate, 3,3'-dimethoxy-4,4'-biphenylene diisocyanate, 2,2', 5,5'-tetramethyl-4,4'-biphenylene diisocyanate, 4,4'-methylenebis(phenylisocyanate), 4,4'-sulfonylbis (phenylisocyanate), 4,4'-methylene di-orthotolylisocyanate, ethylene diisocyanate, trimethylenediisocyanate, diicyclohexyl methane-4,4'-diisocyanate, isophorone diisocyanate, 1,6-hexamethylene diisocyanate, 2,2,4-trimethyl-1,6-hexane diisocyanate, and the like or some combination thereof. Whether MDI or TDI is employed, both traditionally rely on a two-stage process for the manufacture of the polyurethane foam. Concerning this two-stage manufacturing process, both MDI and TDI rely upon a "prepolymer" stage. As should be apparent to those skilled in the art, in the first stage, the prepolymer is prepared. In the second stage, the polyurethane foam is produced. Mixtures of any one or more of the above-mentioned organic isocyanates may be used as desired. The aromatic diisocyanates, aliphatic and cycloaliphatic diisocyanates and polyisocyanates or mixtures thereof which are especially suitable are those which are readily commercially available, have a high degree of reactivity and a relatively low production cost.

In one embodiment, the bio-based polyoxyalkylene glycol polyol is manufactured from feedstock chosen from the group consisting essentially of "bagasse", which is the fibrous waste that remains after sugar cane stalks are crushed to extract their juice. Such biobased PEG polyols of varying molecular weights are commercially available from Acme-Hardesty and Croda. Typically as produced, these 100% biobased polyols contain residual metals and metal oxides that are detrimental to the preparation of quasi- or prepolymer polyurethane systems due to the uncontrollable and energetic side reactions enhanced by these chemical residuals leading to too high molecular weight chains forming which ultimately increases the viscosity of the prepolymers into unmanageable and unpumpable levels.

The adsorbents which may be employed in the practice of this invention are those which will remove the alkaline catalysts. These are the synthetic magnesium and aluminum silicate adsorbents. The synthetic adsorbents may be prepared by the reaction of a magnesium salt or aluminum salt such as magnesium or aluminum sulfate with sodium silicate. The resulting products can have particle sizes ranging from 5 to 500 microns with an average particle size of about 100-200 microns. Such magnesium silicate adsorbents are sold under the trademarks of "BRITE SORB" or "Ambosol" by Philadelphia Quartz Corporation, and "MAGNESOL" by The Dallas Group. Examples of alkali-adsorbents include synthetic magnesium silicate, synthetic aluminum silicate, activated bentonite, acid bentonite and their mixtures.

In one embodiment, the step of mixing the cleaned polyoxyalkylene glycol polyol with a polyfunctional isocyanate to create a polyurethane prepolymer is performed at a temperature between 20-140 degrees Celsius.

In one embodiment, a crosslinked substantially biobased hydrophilic foam comprises a reaction product of: a cleaned biobased polyoxyalkylene glycol polyol with an oxyethylene content of at least 40 mole percent, comprising less than 15 ppm combined sodium and potassium metals, and comprising less than 0.5% water by weight; an isocyanate, wherein the isocyanate and the cleaned biobased polyoxyalkylene glycol polyol are premixed to create a substantially biobased prepolymer mixture, wherein the substantially biobased prepolymer mixture comprises 31.80 to 67.95 percent biogenic carbon content by weight; and water, wherein the water is admixed with the substantially biobased prepolymer mixture to yield the crosslinked substantially biobased hydrophilic foam.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention suggests. Accordingly.

DETAILED DESCRIPTION

Figure 1:
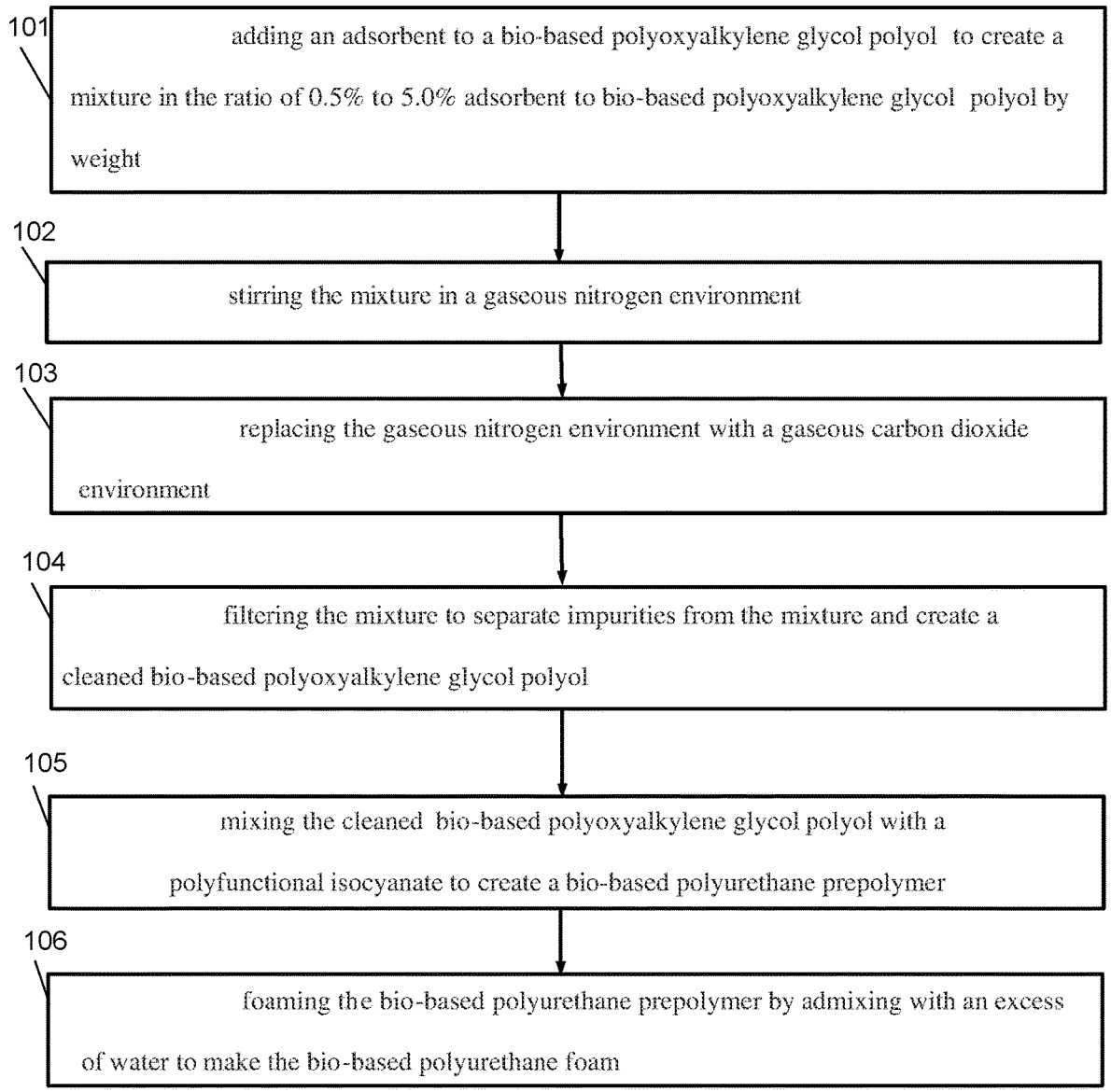
FIG. 1 shows a method for manufacturing a bio-based polyurethane foam.

The following detailed description of the invention is merely exemplary in nature and is not intended to limit the invention or the application and uses of the invention. Furthermore, there is no intention to be bound by any theory presented in the preceding background of the invention or the following detailed description of the invention.

The present disclosure discusses a new class of hydrophilic polyurethane foams that are based on poly(alkyloxide) polyols originating from plant-based and renewable hydrophilic raw materials, namely high or all-EO based polyether polyols. The new class of hydrophilic polyurethane foams overcomes the limitations of the hydrophobic foams that are briefly discussed in the background of this disclosure. The use of these hydrophilic and renewable polyols allow the production of hydrophilic capped polyurethane prepolymers that are subsequently foamed in the presence of a large amount of water admixed intimately during the foaming process to yield a novel class of hydrophilic and biobased polyurethane prepolymers and foams.

Hydrophilic urethane foams of prior art are described in U.S. Pat. Nos. 4,137,200; 4,339,550; 5,976,847 and others, as well as in Polyurethane's Chemistry and Technology by Saunders and Frisch, Volume XVI Part 2, High Polymer Systems. The primary departure from conventional prior art non-hydrophilic urethane foam is in the polyol component. Utilizing a hydrophilic polyol reacted with isocyanate provides a hydrophilic prepolymer. Mixing said hydrophilic prepolymer with water results in hydrophilic urethane foam. Adding an agent into the water results in hydrophilic foam bearing the agent. If the hydrophilic foam composite including agent is subsequently contacted with an outside water-based effluent, the agent may interact with the effluent for an intended purpose. In this described prior art hydrophilic foam composite technology, the contact between the agent and the effluent, or the expression of agent into effluent, is controlled by the inherent hydrophilicity of the urethane foam carrier.

Generally stated, the present method includes reacting an isocyanate capped biobased polyoxyethylene polyol by combining with an excess of water forming a cross-linked hydrophilic cellular foam. Cross-linked hydrophilic foam may thus be prepared by capping the purified, biobased polyoxyethylene polyol with a poly- or mono-isocyanate such that the capped product has a reaction functionality equal to or greater than two. The capped product is foamed simply by combining with an aqueous reactant. Optionally, the capped product and/or aqueous reactant may contain a suitable crosslinking agent if desired, in which case the capped substantially biobased polyoxyethylene polyol product may have a functionality approximating 2.

During capping, it is desirable that polyisocyanate be reacted with the polyol such that the reaction product, i.e., the capped product, is substantially void of reactive hydroxy groups while containing more than two reactive isocyanate sites per average molecule. Another route for achieving this desired result is to react a polyisocyanate having two reactive active isocyanate sites per average molecule, in a reaction system during foaming having a polyfunctional reactive component such as one having from three up to about six or more reactive amine, hydroxy, thiol, or carboxylate sites per average molecule. These latter sites are highly reactive with the two reactive isocyanate sites and thereby form a dimensional product. The novelty as described herein presents the use of bio-derived polyoxyalkylene polyols as the primary hydroxyl moiety of the molecular backbone of the polyurethane prepolymer and resultant foam yielding a substantially biobased cellular matrix that compositionally is greater than 50% by weight based on a truly renewable raw material.

U.S. Pat. No. 4,137,200, issued Jan. 30, 1979 to Wood et al. discloses a two-step process in which hydrophilic cross-linked polyurethane foams may be prepared by reacting a particular isocyanate-capped petroleum based polyoxyethylene (PEG) polyol with large amounts of an aqueous reactant. The '200 patent further teaches that the prepolymer may be formed from mixtures or blends of various polyols and/or polyisocyanates with this unique family of hydrophilic prepolymers based on PEG and other polyfunctional alcohols. All disclosures and manifestations of this base chemistry utilize polyols and isocyanates that are entirely petroleum derived.

Biobased polyoxyethylene polyol used as a reactant in preparing the capped product to be foamed may have a weight average molecular weight of about 200 to about 20,000, and preferably between about 600 to about 60,000, with a hydroxyl functionality of about 2 or greater, preferably from about 2 to about 6. Biobased polyoxyethylene polyol is terminated or capped by reaction with a polyisocyanate. The reaction may be carried out in an inert moisture-free atmosphere such as under a nitrogen blanket at atmospheric pressure at a temperature in the range of from about 60 C to about 140 C for a period of time of about hours depending upon the temperature and degree of agitation. This reaction may be effected also under atmospheric conditions provided the product is not exposed to excess moisture. The polyisocyanates used for capping the biobased polyoxyethylene polyol include polyisocyanates and polyisothiocyanates which are PAPPI-1 (a polyaryl polyisocyanate as defined in U.S. Pat. No. 2,683,730), toluene diisocyanate (TDI), triphenylmethane-4,4,4",-triisocyanate, benzenel, 3,5-triisocyanate, toluene-2,4,6-triisocyanate,diphenyl-2,4,4'-triisocyanate, hexamethylene diisocyanate, xylene diisocyanate, chlorophenylene diisocyanate, diphenylmethane-4,4- diisocyanate, naphthalene-1, S-diisocyanate, xylenealpha, alpha'-diisothiocyanate, 3,3-dimethyl-4, 4'-biphenylene diisocyanate, 2,2',5,5-tetramethyl-4, 4-biphenylene diisocyanate, 4,4'-methylenebis (phenylisocyanate), 4,4'-sulfonylbis (phenylisocyanate), 4,4-methylene di-orthotolylisocyanate, ethylene diisocyanate, ethylene diisothiocyanate, trimethylenediisocyanate and the like. Mixtures of any one or more of the above mentioned organic isothiocyanates or isocyanates may be used as desired. The aromatic diisocyanates and polyisocyanates or mixtures thereof which are especially suitable are those which are readily commercially available, have a high degree of reactivity and a relatively low cost but unfortunately there is no known mass produced biobased polyisocyanate. Alternatively, aliphatic di and poly functional isocyanates can be employed to react with the biobased polyethylene glycol polyols to form the capped polyurethane prepolymers with suitable polyisocyanates being 1,4-butylene diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)-methanes or their mixtures of any desired isomer content, 1,4-cyclohexylene diisocyanate, 1,4-phenylene diisocyanate, 2,4- and/or 2,6-tolylene diisocyanate, 1,5-naphthylene diisocyanate, 2,2'- and/or 2,4'- and/or 4,4'-diphenylmethane diisocyanate, 1,3- and/or 1,4-bis(2-isocyanatoprop-2-yl) benzene (TMXDI), 1,3-bis(isocyanatomethyl)benzene (XDI), alkyl 2,6-diisocyanatohexanoate (lysine diisocyanates) with C1-C8 alkyl groups, and also 4-isocyanatomethyl-1,8-octane diisocyanate (nonane triisocyanate) and triphenylmethane 4,4',4"-triisocyanate.

Capping of the biobased polyoxyethylene polyol may be effected using stoichiometric amounts of reactants. Desirably, however, a slight excess of isocyanate is used to insure complete capping of the polyol. Thus, the ratio of isocyanate groups to the hydroxyl groups used for capping is between about 1 to about 4 isocyanate to hydroxyl, and preferably about 2 to about 3 isocyanate to hydroxyl molar ratio.

To obtain the maximum foam strength, resistance to compression set and the like, the isocyanate capped biobased polyoxyethylene polyol reaction products are formulated in such a manner as to give crosslinked, three-dimensional network polymers on foaming. In order to achieve such infinite network formation on foaming, the reactive components may be formulated in one of the following by way of example. First, when water slurry is the sole reactant with the isocyanate groups leading to chain growth during the foaming process, the isocyanate capped biobased polyoxyethylene polyol reaction product must have an average isocyanate functionality greater than 2 and up to about 6 or more depending upon the composition of the polyol and capping agent components. Secondly, when the isocyanate capped polyoxyethylene polyol has an isocyanate functionality of only about two, then the water slurry, i.e., aqueous reactant, used may contain a dissolved or dispersed isocyanate-reactive crosslinking agent having an effective functionality greater than two. In this case, the reactive crosslinking agent is reacted with the capped biobased polyoxyethylene polyol when admixed during and after the foaming process has been initiated. Thirdly, when the isocyanate capped biobased polyoxyethylene polyol has an isocyanate functionality of only about two, then a polyisocyanate crosslinking agent having an isocyanate functionality greater than two may be incorporated therein, either preformed or formed in situ, and the resultant mixture may then be reacted with water slurry, i.e., aqueous reactant, optionally containing a dissolved or dispersed reactive isocyanate-reactive crosslinking agent, leading to a crosslinked, infinite network hydrophilic polyurethane foam. It is readily demonstrated that alcohol functional additives can be employed to tailor the physical properties of the desired cellular polyurethane foam. Thus the addition of mono- and polyhydric alcohols and mixtures thereof can be used to improve the properties of the resulting polyurethane foam with examples being mono- or polyhydric alcohols or polyols, such as ethanol, propanol, butanol, decanol, tridecanol, hexadecanol, ethylene glycol, neopentyl glycol, butanediol, hexanediol, decanediol, trimethylolpropane, glycerol, pentaerythritol, monofunctional polyether alcohols and polyester alcohols, polyether diols and polyester diols. If these additives are chosen from available renewable resources, they will be intimately impregnated within the foam matrix and increase the overall biobased content of the foam.

In order to differentiate bio-based carbon from petroleum-based carbon, ASTM subcommittee D20.96 developed a differentiation methodology into a Standard ASTM D6866. The next few paragraphs discuss the methodology.

It is known in the art that carbon-14 (C-14), which has a half-life of about 5,700 years, is found in bio-based materials but not in fossil fuels. Thus, "bio-based materials" refer to organic materials in which the carbon comes from non-fossil biological sources. Examples of bio-based materials include, but are not limited to, sugars, starches, corns, natural fibers, sugarcanes, beets, citrus fruits, woody plants, cellulosics, lignocelluosics, hemicelluloses, potatoes, plant oils, other polysaccharides such as pectin, chitin, levan, and pullulan, and any combination thereof. According to a particular embodiment, the at least one bio-based material is selected from corn, sugarcane, beet, potato, starch, citrus fruit, woody plant, cellulosic lignin, plant oil, natural fiber, oily wood feedstock, and a combination thereof.

The detection of C-14 is indicative of a bio-based material. C-14 levels can be determined by measuring its decay process (disintegrations per minute per gram carbon or dpm/gC) through liquid scintillation counting and this technique has been used for decades by archaeologists to date fossils. Biobased materials may contain 100% biogenic carbon (new carbon) or be mixed (physically, chemically, or biologically) with fossil/petroleum-based carbon (old carbon). Therefore, one needs to define biobased content—the amount of biogenic carbon present in the product—to properly and definitively express the biobased content of a particular product or material.

FIG. 1 shows a method for manufacturing a substantially bio-based polyurethane foam. Shown are Step 101, adding an adsorbent to a bio-based polyoxyalkylene glycol polyol to create a mixture in the ratio of 0.5% to 5.0% adsorbent to bio-based polyoxyalkylene glycol polyol by weight; Step 102, stirring the mixture in a gaseous nitrogen environment; Step 103, replacing the gaseous nitrogen environment with a gaseous carbon dioxide environment; Step 104, filtering the mixture to separate impurities from the mixture and create a cleaned bio-based polyoxyalkylene glycol polyol; Step 105, mixing the cleaned bio-based polyoxyalkylene glycol polyol with a polyfunctional isocyanate to create a substantially bio-based polyurethane prepolymer; and Step 106, foaming the substantially bio-based polyurethane prepolymer by admixing with an excess of water to make the substantially bio-based polyurethane foam.

Figure 2:
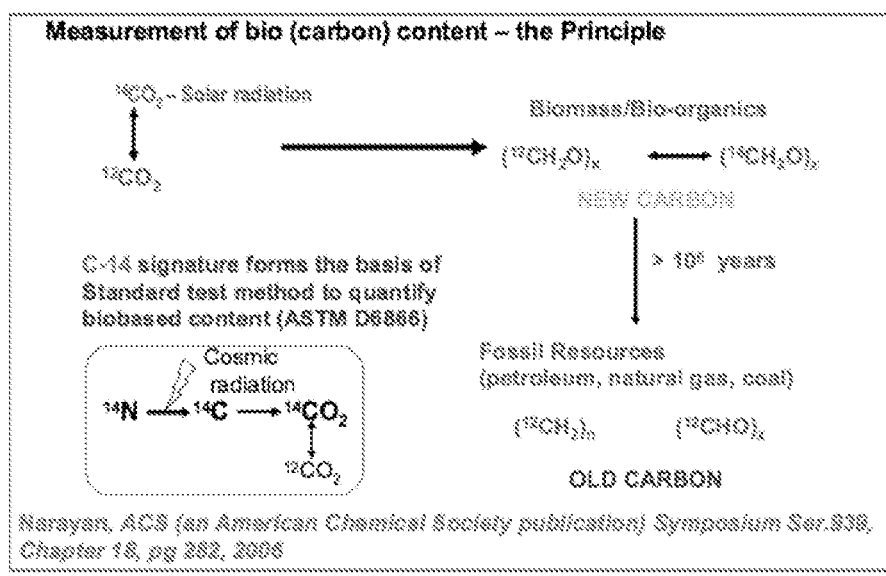
FIG. 2 is a diagram that shows the principles involved in creating and identifying bio-based carbon.

As shown in FIG. 2, 14C signature forms the basis for identifying and quantifying bio-based content. The CO2 in the atmosphere is in equilibrium with radioactive 14CO2.

Radioactive carbon is formed in the upper atmosphere through the effect of cosmic ray neutrons on 14N. It is rapidly oxidized to radioactive 14CO2, and enters the Earth's plant and animal lifeways through photosynthesis and the food chain. Plants and animals which utilize carbon in biological food chains take up 14C during their lifetimes. They exist in equilibrium with the 14C concentration of the atmosphere, that is, the numbers of C-14 atoms and non-radioactive carbon atoms stays approximately the same over time. As soon as a plant or animal dies, they cease the metabolic function of carbon uptake; there is no replenishment of radioactive carbon, only decay. Since the half-life of carbon is around 5730 years, the fossil feedstocks formed over millions of years will have no 14C signature. Thus, by using this methodology one can identify and quantify biobased content.

Figure 3:
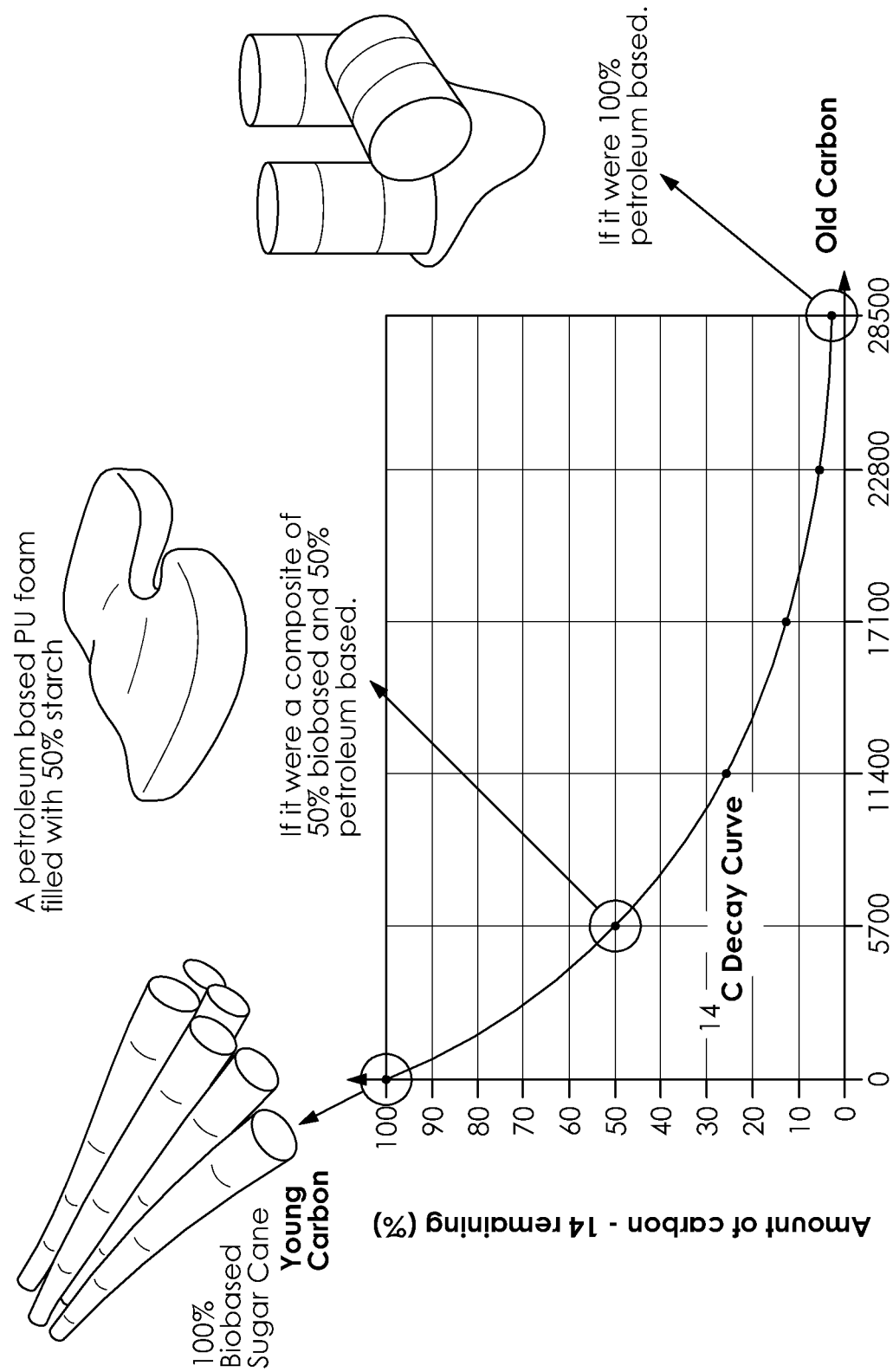
FIG. 3 depicts a 14-Carbon decay curve.

FIG. 3 depicts a 14Carbon decay curve.

In an effort to diminish dependence on petroleum products the United States government enacted the Farm Security and Rural Investment Act of 2002, section 9002 (7 U.S.C. 8102), hereinafter "FRISA", which requires federal agencies to purchase bio-based products for all items costing over $10,000. In response, the United States Department of Agriculture ("USDA") has developed Guidelines for Designating Bio-based Products for Federal Procurement (7 C.F.R. § 2902) to implement FRISA, including the labeling of bio-based products with a "U.S.D.A. Certified Bio-based Product" label.

These FRISA methods require the measurement of variations in isotopic abundance between biobased products and petroleum derived products, for example, by liquid scintillation counting, accelerator mass spectrometry, or high precision isotope ratio mass spectrometry. Isotopic ratios of the isotopes of carbon, such as the 13C/12C carbon isotopic ratio or the 14C/12C carbon isotopic ratio, can be determined using analytical methods, such as isotope ratio mass spectrometry, with a high degree of precision. Studies have shown that isotopic fractionation due to physiological processes, such as, for example, CO2 transport within plants during photosynthesis, leads to specific isotopic ratios in natural or bioderived compounds. Petroleum and petroleum derived products have a different 13C/12C carbon isotopic ratio due to different chemical processes and isotopic fractionation during the generation of petroleum. In addition, radioactive decay of the unstable 14C carbon radioisotope leads to different isotope ratios in biobased products compared to petroleum products. Biobased content of a product may be verified by ASTM International Radioisotope Standard Method D 6866. ASTM International Radioisotope Standard Method D 6866 determines biobased content of a material based on the amount of biobased carbon in the material or product as a percent of the weight (mass) of the total organic carbon in the material or product. Both bio-derived and biobased products will have a carbon isotope ratio characteristic of a biologically derived composition.

Polyfunctional hydroxyl compounds, besides the isocyanates, are essential components in the formation of polyurethanes. Smaller chain polyalcohols such as ethylene glycol, glycerine, butanediol, trimethyolpropane, etc. act widely and commercially as chain extenders or cross linkers. Higher molecular weight polyols (with Mw averages up to ~12000 g/mole) form the basis of the vast polyurethane chemistry and market global profiles.

In the late 1960s and early 1970s, it became very clear that polyether-based polyols were well suited for flexible foam performance requirements and these block and random copolymers of ethyleneoxide and propyleneoxide now dominate the global PU foam market. The alkali-catalyzed addition reaction of expoxides to all kinds of polyol starting materials leads to an infinite array of possible functionalities and molecular weights and distributions.

Figure 4:
FIG. 4 shows the reaction sequence of ethylene oxide and propylene oxide when influenced by potassium hydroxide leading to polyoxyalylene glycol polyols suitable for polyurethane prepolymer formation.
Figure 4:
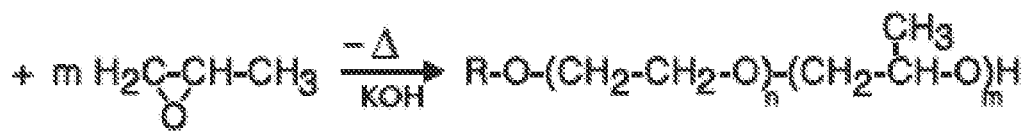

FIG. 4 shows the reaction sequence of ethylene oxide and propylene oxide when influenced by potassium hydroxide.

Common residuals of this commercial process are levels of sodium and potassium salts, metal-oxides, and moisture that remain in the bulk polyols. While existing cleaning methods control and tailor these component concentrations, their typical levels are higher than what is appropriate for the preparation of the described polyurethane prepolymers and foams made therefrom.

Polyoxyalkylene ether polyols, hereinafter for convenience called polyols, are commonly used in the production of urethane polymers. These polyols are reacted with polyisocyanate and other materials to produce urethane polymers which may be in the form of rubber-like elastomers, flexible or rigid foams and the like. In order that urethane polymers of desired properties and characteristics be produced, it is important that the polyols to be reacted with the polyisocyanate are essentially free of impurities which may function as undesirable catalysts or lead to undesirable side reactions during the desirable urethane polymer reaction.

The normal concentrations of metal based (sodium or potassium) catalysts range from 1700 to 4000 parts per million during polyol manufacturing. Filtration methods are employed to bring these residual levels into the low tens PPM level when these polyols are subsequently used in the production of conventional or traditional flexible slabstock PU foams. Under the foaming conditions using these traditional secondary polyols, the catalytic effects of these residual metals and metal hydroxides are managed and accommodated during the one-shot foaming process for flexible polyurethane foams where reaction temperatures regularly exceed 150 C. Under these reaction conditions, higher residual levels of these metals are acceptable and well-managed. Currently, all PO or high-PO content copolymers dominate the flexible slabstock foaming markets so production reactivity is mainly governed by the kinetics of the secondary hydroxyl chain ends and their reactivity profiles during the isocyanate reaction during foaming. It is now common for those skilled in the art and industrially to terminate the chain ends of the polyaddition reaction with EO thus yielding a high concentration of primary hydroxyl termini at the polyol chain ends. Control of this important parameter allows tailoring of the kinetics of the resultant polyurethane reaction so EO containing polyoxyakylene polyols become available and commonplace in the polyurethane marketplace.

The all EO polyols used in this invention are unique in that they are completely primary hydroxyl-tipped or end-grouped. Primary hydroxyl alcohols have a greater than three-fold reactivity increase over their secondary chain terminated analogs so the reaction with a specific isocyanate is much faster and more energetic for PEG based polyurethane systems and foams over their analogous PO-tipped or secondary dominated alcohol chain ends.

When making polyurethane prepolymer under the conditions and compositions described in this filing, typical levels of residual metals and other contaminants readily residing within the commercially employed polyether polyol production processes do not work and are not appropriate in the production of biobased hydrophilic polyurethane prepolymers and foams therefrom. Additional cleaning or scrubbing of specific impurities is required to prepare base polyols, Biobased PEG in this case, used in the production of hydrophilic polyurethane prepolymers and foams described herein.

Not only are residual metal levels critical (Na+ and K+ levels) in the production of hydrophilic polyurethane prepolymers but moisture levels also need to be controlled and minimized. If these levels are kept at typical levels found in conventional polyether polyols used in traditional polyurethane chemistries, one cannot achieve a flowable functioning finished or quasi-prepolymer that can be subsequently foamed when admixing with excess water, as in the case with this patent filing. When combined levels of sodium and potassium exceed 15 ppm within the BioPEG polyol, the reaction with all isocyanates tested and listed herein—even the more slowly reacting aliphatic systems—all lead to an uncontrollable exotherm that invariably yields a gelled, non-flowing, and/or rigid elastomer that can neither be produced or foamed in production. When further processed in this manner to reduce metal, metal oxide, and moisture residual levels, BioPeg1000 was capable of further polymerization into a PU prepolymer to yield substantially biobased hydrophilic prepolymers and foams.

Example #1: The adsorbents which can be employed in the practice of this invention are synthetic magnesium silicate adsorbents. They may be prepared by the reaction of a magnesium salt such as magnesium sulfate with sodium silicate. The typical resulting products can have particle sizes ranging from 100 to 500 microns with an average particle size of about 325 microns. These adsorbents are sold under trademarks "MAGNESOL" by The Dallas Group or "AMBOSOL" by the PQ Corporation. The amount of adsorbent which was employed depends on the concentration of catalyst present in the polyol. Thus, amounts ranging from about 0.5 percent to about 5 percent by weight based on the weight of the polyol may be employed. Preferably, however, the concentration of adsorbent ranges from about 1.0 percent to about 3.0 percent based on the weight of polyol. More preferably, the concentration of adsorbent ranges from about 1.0 to about 2.0 weight percent based on the weight of the polyol. From an economical point of view, it is preferable to use as little as possible of the adsorbent so to 1205 g BioPeg1000 was added 1% (10 g) Magnesol powder in a 1500 mL Erlenmeyer flask blanketed with N2 atmosphere. The mixture was stirred at 80° C. for 30 minutes at which point the N2 atmosphere was replaced with a bubbling addition of gaseous CO2 over the course of 15 minutes. The mixture was then filtered through a pressure filter composed of a horizontal Sparkle filter No. JKS86 with the pressure adjusted to maintain a 45 psi head pressure above the filtering plates. Filtration lasted 30 minutes and yielded 1108 g (92.3% yield) of BioPEG1000 which contained low levels of residual sodium, potassium, moisture, and alkalinity as per the table above.

TABLE 1 below shows metal cleaning results for polyethylene glycol (PEG) molecules by inductively coupled plasma spectroscopy (ICP).

TABLE 1

|  | Potassium (ppm) | Sodium (ppm) | Moisture Level (%) | pH |
| --- | --- | --- | --- | --- |
| Peg 1000 Bio. (AH) Lot no. 141113A | 112.500 | 1.042 | 0.46 | 6.5 |

TABLE 1-continued

|  | Potassium (ppm) | Sodium (ppm) | Moisture Level (%) | pH |
| --- | --- | --- | --- | --- |
| Before Cleaning Peg 600 Pet. (Sigma Aldrich Lot. BCBM2354V) | 399.000 | 2.858 | 0.57 | 6.1 |
| Before Cleaning Peg 1000 Dow Sentry Grade Commercial | 5.110 | 2.251 | 0.02 | 5.1 |
| Peg 1000 Bio. (AH) Lot no. 141113A After Cleaning | 1.260 | 1.252 | 0.03 | 4.7 |
| Peg 1500 Bio. (AH) Lot no. B130203 Before Cleaning | 243.000 | 2.236 | 0.63 | 6.1 |
| Peg 1500 Pet. (Sigma Aldrich Lot. BCBN3227V) | −0.001 | 119.499 | 0.07 | 5.7 |

Both the biologically sourced and petroleum derived PEG polyols (600, 1000, 1500 g/mole) have a significantly high value of potassium that catalyze the reaction of these PEG molecules with polyfunctional diisocyanate leading to gelling the prepolymer synthesis reaction.

The filtration process using Magnesol and Ambosol, magnesium silicate adsorbents, adequately sequester residual metals (Na+ and K+) and residual moisture from the PEG polyols.

The PEG polyols (200-20,000 g/mole, preferably between 600-3000 g/mole and ideally between 800-1500 g/mole) cleaned with adequate adsorbent yield polyols with very low concentration of either metal ion and low moisture levels (<0.5% moisture preferably <0.3% and ideally below 0.1% water). Moisture level is measured and presented on a weight-by-weight percentage basis—mass of moisture in total mass of BioPEG polyol. When properly cleaned, these PEG based polyols lead to functional and flowable prepolymers that can be foamed into functional cellular foam products.

Example #2: A bioprepolymer was prepared by admixing 0.134 molar equivalents of biobased polyethylene glycol having an average molecular weight of 1,000 (PEG—1,000) and 0.046 molar equivalent of Glycerine (GLY). The mixture was slowly added over a period of about one hour to a vessel containing 0.346 molar equivalents of 80/20 toluene diisocyanate (TDI) while stirring the TDI and polyol mixture. The temperature was maintained at 70° C. with stirring for three additional hours. All hydroxyl groups were capped with isocyanate and some chain extension occurred because of crosslinking of the polyols with TDI. The resultant biobased prepolymer has a theoretical NCO % of 7.12% with a titrated (ASTM D3574) NCO % of 7.03. Hydrophilic foams have been prepared from the above prepolymer using large amounts of water as described previously. These foams exhibit good physical properties, and various materials can be incorporated into the aqueous phase when preparing the foams.

Example #3: A mixture of 304.4 g TDI and 0.34 g of benzoyl chloride was admixed at 70° C. during 3 h with 675.1 g of a biopolyethylene glycol having a molar mass of 1000 g/mole containing 20.5 g Trimethyloyl propane (TMP). To the polyol blend was added 400 ppm BHT with stirring followed by dropwise addition and subsequently stirred for 3 hours. This gave a prepolymer having a theoretical NCO content of 7.08% and a viscosity of 12,000 mPas at 25 C.

Example #0721-4: A mixture of 105.3 g TDI and 100 ppm benzoyl chloride was admixed at 70° C. during 3 hours with a mixture of 136.0 g of a polyalkylene oxide having a molar mass of 5400 g/mole started on glycerol, an ethylene oxide weight fraction of 72% and a propylene oxide weight fraction of 28% and 258.8 g biobased polyethylene glycol having a molar mass of 1000 g/mol by dropwise addition and subsequently stirred for 3 hours at 70 C. This gave a prepolymer A) having a biobased content of 51.75% and B) a theoretical NCO content of 5.12%.

Example #5: To a reaction vessel containing 145.83 g biobased and cleaned polyethylene glycol having a molar mass of 1000 g/mole and 4.63 g Glycerine along with 300 ppm Irganox 245 antioxidant stirred at 60 C w here added to 99.54 grams of 4,4'MDI stirred at room temperature with 100 ppm isooctylphosphoric acid (IOAP). The reaction exotherm was kept at 70 C. by external cooling with water, while stirring for 4 hours. The actual isocyanate content, determined by titration with standard n-butylamine solution in toluene, remained at the constant level of 5.68% NCO relative to a theoretical content of 5.94% NCO. The resultant pale yellow bioprepolymer has a biocontent of 60.2% and a viscosity of 9750 cPs at 25 C. A foam was prepared by adding to 100 grams of this biobased polyoxyethylene triisocyanate with good stirring (3000 rpm), a mixture of 100 grams water and 1.0 grams of silicone surfactant. After mixing for seconds to achieve an initial cream state, the reaction mixture was poured into a wax-lined cup and allowed to expand and cure to a tack free surface for 4 minutes. The resultant foam was an open-celled, flexible hydrophilic foam with good elongation and tensile strength in both the dry and saturated state.

Example #6: A mixture of 82.71 g Suprasec 2004 as a modified MDI resin with an equivalent weight of 128.0 and 0.14 g of benzoyl chloride was admixed at 70° C. to which was added with 167.3 g of a biobased and cleaned polyethylene glycol having a molar mass of 1000 g/mole along with 300 ppm Irganox 245 antioxidant. This polyol mixture was dropwise added to the stirred isocyanate mixture followed with stirring for 3 h while the temperature was held at 70 C via an orbital oven. This gave a prepolymer having a theoretical NCO content of 5.23%, a titrated value of 5.18%, and a viscosity of 10,520 cPs at 25 C.

Table #2 lists the chemical properties of the presented hydrophilic biobased prepolymer formulations and Table #3 lists the physical properties of the resultant foams made from the aforementioned set of prepolymers according to this presented invention.

Table #2, last column, shows a Theoretical % BioPEG (Wt % of total Prepolymer) yield as high as 68.59%. In a separate embodiment, the Theoretical % BioPEG (Wt % of total Prepolymer) yield can be as high as 85%.

TABLE 2

| Prepolymer Composition | Isocyanate + (name, NCO eq.) | Diol (name, OH eq.) | X-Linker (name, OH eq.) | Theoretical NCO %, Actual NCO % | Viscosity cPs @25 C. Spindle#4 | Theoretical % BioPEG (Wt % of total Prepolymer) |
|---|---|---|---|---|---|---|
| Example #2 | TDI, 0.3459 | BioPEG1000, 0.1337 | Glycerin, 0.0456 | 7.12, 7.03 | 11,250 | 68.59 |
| Example #3 | TDI, 0.3460 | BioPEG1000, 0.1337 | TMP, 0.0457 | 7.08, 6.99 | 12,500 | 68.15 |
| Trial #7 | TDI, 0.3461 | BioPEG1000, 0.110 | TMP, 0.0850 | 7.13, 7.01 | 14,750 | 61.80 |
| Example #4 | TDI, 0.2755 | BioPEG1000, 0.1180 | GP5171, eq. wt. = 548, 0.187 | 5.12, 4.96 | 9,800 | 31.80 |
| Trial #8 | TDI, 0.3459 | Petroleum PEG1000, 0.1420 | Glycerin, 0.0570 | 6.00, 5.79 | 13,100 | N/A (utilized petroleum based PEG) |
| Example #5 | MDI 4,4', 0.3440 | BioPEG1000, 0.126 | Glycerin, 0.0652 | 5.94, 5.79 | 7,500 | 58.31 |
| Example #6 | MDI Suprasec 2004, 0.3438 | BioPEG1000, 0.1780 | — | 5.23, 5.03 | 6,800 | 66.9 |
| Trial #9 | MDI Rubinate 9433, 0.3523 | BioPEG1000, 0.1337 | Glycerin, 0.0500 | 6.17, 6.00 | 7,700 | 57.78 |
| Trial #10 | TDI, 0.3460 | PEG600, 0.1337 | Glycerin, 0.0424 | 7.04, — | Gelled | 46.55 |
| Trial #11 | TDI, 0.2778 MDI 4,4', 0.0880 | BioPEG1000, 0.1337 | Glycerin, 0.0532 | 7.20, 7.12 | 9,900 | 63.89 |
| Trial #12 | IPDI, 0.3422 | BioPEG1000, 0.1358 | TMP, 0.0454 | 6.76, 6.55 | 10,800 | 64.0 |

+ TDI—80/20 (2,4-, 2,6-) Toluene diisocyanate Grade I, Suprasec 2004, polymeric MDI, Huntsman Chemical Rubinate 9433, high 2,4 MDI isomer, Huntsman Chemical
~ As per ASTM D3574
Brookfield #4
" As per ASTM D6866

TABLE 3

| Prepolymer Composition | BioContent % | Foam Properties | Tensile (psi) | Elongation (%) | CFD @50% (psi) |
|---|---|---|---|---|---|
| Example #2 | 67.95 | | 19 | 345 | 0.43 |
| Example #3 | 67.5 | | 22 | 320 | 0.54 |
| Trial #7 | 61.8 | | 25 | 250 | 0.64 |
| Example #4 | 31.80 | | 27 | 375 | 0.55 |
| Trial #8 | 1.70 | | 23 | 315 | 0.55 |
| Example #5 | 58.31 | | 33 | 210 | 0.77 |
| Example #6 | 66.9 | | 32 | 230 | 0.71 |
| Trial #9 | 59.44 | | 34 | 245 | 0.68 |
| Trial #10 | 68.01 | Gelled | — | — | — |
| Trial #11 | 64.47 | | 33 | 305 | 0.66 |
| Trial #12 | 62.89 | Long foaming time | 17 | 375 | 0.47 |

All patents and publications mentioned in the prior art are indicative of the levels of those skilled in the art to which the invention pertains. All patents and publications are herein incorporated by reference to the same extent as if each individual publication was specifically and individually indicated to be incorporated by reference, to the extent that they do not conflict with this disclosure.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations, and broad equivalent arrangements.

I claim:

1. A substantially biobased prepolymer mixture comprising 31.80 to 67.95 percent biogenic carbon content by weight, wherein the mixture is a combination of:
   an isocyanate; and
   a cleaned biobased polyoxyalkylene glycol polyol, wherein the cleaned biobased polyoxyalkylene glycol polyol is completely primary hydroxyl-tipped or primary hydroxyl end-grouped, further wherein said cleaned biobased polyoxyalkylene glycol polyol is polymerized from 100% biobased ethylene oxide, further wherein the cleaned biobased polyoxyalkylene glycol polyol comprises less than 15 ppm sodium and potassium metals, and further wherein the cleaned biobased polyoxyalkylene glycol polyol comprises less than 0.5% water by weight.

2. A substantially biobased prepolymer mixture comprising 31.80 to 67.95 percent biogenic carbon content by weight, wherein the mixture is a combination of:
   an isocyanate; and
   a cleaned biobased polyoxyalkylene glycol polyol with an oxyethylene content of greater than 50 mole percent, further wherein said cleaned biobased polyoxyalkylene glycol polyol is polymerized from 100% biobased ethylene oxide, further wherein the cleaned biobased polyoxyalkylene glycol polyol comprises less than 15 ppm sodium and potassium metals, and further wherein the cleaned biobased polyoxyalkylene glycol polyol comprises less than 0.5% water by weight.

* * * * *